United States Patent
Cantero Clares (10) Patent No.: US 10,812,785 B2
(45) Date of Patent: Oct. 20, 2020

(54) STEREOSCOPIC DISPLAY DEVICE AND PARAMETER CALIBRATION METHOD THEREOF

(71) Applicant: Acer Incorporated, New Taipei (TW)

(72) Inventor: Sergio Cantero Clares, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/547,580

(22) Filed: Aug. 22, 2019

(65) Prior Publication Data

US 2020/0186787 A1 Jun. 11, 2020

(30) Foreign Application Priority Data

Dec. 11, 2018 (TW) .............................. 107144649 A (51) Int. Cl.
| | |
|---|---|
| H04N 13/327 | (2018.01) |
| G06T 7/70 | (2017.01) |
| H04N 13/344 | (2018.01) |
| H04N 13/239 | (2018.01) |
| H04N 13/383 | (2018.01) |

(52) U.S. Cl.
CPC ............. H04N 13/327 (2018.05); G06T 7/70 (2017.01); H04N 13/239 (2018.05); H04N 13/344 (2018.05); H04N 13/383 (2018.05); G06T 2207/30201 (2013.01)

(58) Field of Classification Search
None
See application file for complete search history.

(56) References Cited

U.S. PATENT DOCUMENTS

| | | | |
|---|---|---|---|
| 10,317,680 B1* | 6/2019 | Richards | G02B 27/0172 |
| 2013/0050833 A1* | 2/2013 | Lewis | G02B 30/36 359/630 |
| 2014/0104143 A1 | 4/2014 | Benson et al. | |
| 2016/0065952 A1* | 3/2016 | Han | G06K 9/00604 345/8 |
| 2017/0099482 A1* | 4/2017 | Fateh | H04N 13/344 |
| 2017/0184847 A1* | 6/2017 | Petrov | G02B 27/017 |
| 2018/0335840 A1* | 11/2018 | Lin | G06K 9/036 |
| 2019/0073820 A1* | 3/2019 | Barron | G02B 27/0179 |

FOREIGN PATENT DOCUMENTS

| | | |
|---|---|---|
| CN | 104603673 | 5/2015 |
| CN | 106445167 | 2/2017 |

\* cited by examiner

*Primary Examiner* — Rebecca A Volentine
(74) *Attorney, Agent, or Firm* — JCIPRNET (57) ABSTRACT

The invention provides a parameter calibration method, applicable to a stereoscopic display device including a camera. The parameter calibration method includes the following steps: displaying a virtual object for calibration; obtaining, by using the camera, a two-eye visual angle by which the virtual object for calibration is watched; calibrating a human eye parameter according to the two-eye visual angle, where the human eye parameter includes at least one of an interpupillary distance parameter and an eye relief parameter; and setting the stereoscopic display device according to the calibrated human eye parameter, such that the stereoscopic display device displays according to the calibrated human eye parameter. In addition, a stereoscopic display device using the parameter calibration method is also provided.

8 Claims, 4 Drawing Sheets

STEREOSCOPIC DISPLAY DEVICE AND PARAMETER CALIBRATION METHOD THEREOF

CROSS-REFERENCE TO RELATED APPLICATION

This application claims the priority benefit of Taiwan application serial no. 107144649, filed on Dec. 11, 2018. The entirety of the above-mentioned patent application is hereby incorporated by reference herein and made a part of this specification.

BACKGROUND OF THE INVENTION

1. Field of the Invention

The invention relates to a stereoscopic display technology, and in particular, to a stereoscopic display device and a parameter calibration method thereof.

2. Description of Related Art

Virtual reality (VR) uses computer simulation to generate a virtual world of a three-dimensional space, provides users with simulations of visual sense and other senses, allows the users to feel as if they are immersive and makes them observe things in the three-dimensional space in real time without restriction. However, the current virtual reality technology still has many problems to overcome. For example, the dizziness reaction of a user is one of the most important problems. In the past research, many reasons may cause users to experience dizziness when using stereoscopic display devices (for example, virtual reality devices), and the causes of dizziness may be different for different users.

For example, a general stereoscopic display device displays a stereoscopic picture according to a preset interpupillary distance (IPD) parameter and an eye relief parameter. However, since the distance between the eyes of each user is different, when the stereoscopic display device displays by using a preset interpupillary distance parameter, the pupil center of the user, the center of a lens and the center of a picture may not be in the same line, and the resulted ghost phenomenon may cause dizziness. On the other hand, when each user uses the stereoscopic display device, distances from eyes to a device lens are not the same, so when the stereoscopic display device displays by using a preset eye relief parameter, the depth of field in the picture frequently deviates from the cognition of the user, which may cause dizziness. Although the current stereoscopic display devices provide hardware adjustment functions, the dizziness problem still cannot be resolved due to large adjustment errors.

SUMMARY OF THE INVENTION

In view of this, embodiments of the invention provide a stereoscopic display device and a parameter calibration method thereof, which can calibrate parameters such as an interpupillary distance and an eye relief according to a current user of the stereoscopic display device and display a stereoscopic picture accordingly to improve user experience.

The parameter calibration method of the embodiment of the invention is applicable to a stereoscopic display device including a camera, and includes the following steps: displaying a virtual object for calibration; obtaining, by using the camera, a two-eye visual angle by which the virtual object for calibration is watched; calibrating a plurality of human eye parameters according to the two-eye visual angle, where the plurality of human eye parameters include at least one of an interpupillary distance parameter and an eye relief parameter; and setting the stereoscopic display device according to the plurality of calibrated human eye parameters, such that the stereoscopic display device displays according to the plurality of calibrated human eye parameters.

The stereoscopic display device of the embodiment of the invention includes a stereoscopic display, a camera and a processor. The stereoscopic display is configured to display a virtual object for calibration. The camera is configured to capture a human eye image of watching the virtual object for calibration. The processor is coupled to the stereoscopic display and the camera, and is configured to: obtain, according to the human eye image, a two-eye visual angle by which the virtual object for calibration is watched; calibrate a plurality of human eye parameters according to the two-eye visual angle, where the plurality of human eye parameters include at least one of an interpupillary distance parameter and an eye relief parameter; and display by using the stereoscopic display according to the plurality of calibrated human eye parameters.

In order to make the aforementioned and other features and advantages of the invention obvious and comprehensible, embodiments accompanied with figures are described in detail below.

DESCRIPTION OF THE EMBODIMENTS

Some of the embodiments of the invention will be accompanied with the drawings in the following for detailed description. When the same component symbols referenced in the following description appear in different drawings, they will be regarded as the same or similar components. These embodiments are merely a part of the invention and do not disclose all of the implementation ways of the invention. Rather, these embodiments are merely examples of a device and a method in the scope of the patent application of the invention.

Figure 1:
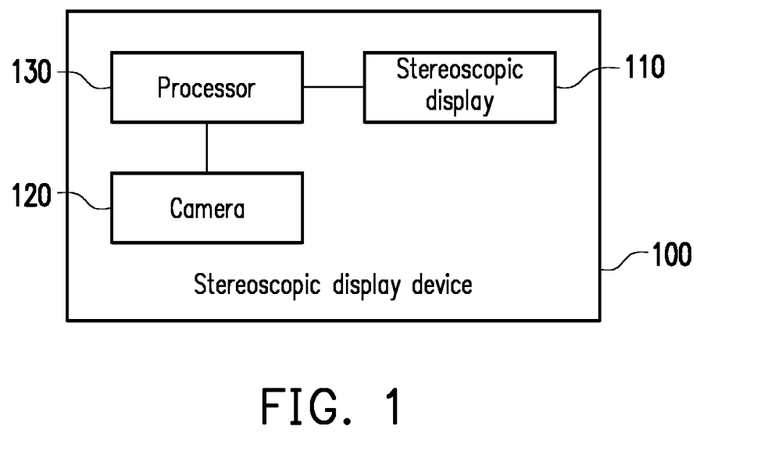
FIG. 1 is a schematic block diagram of a stereoscopic display device according to an embodiment of the invention.
Figure 2:
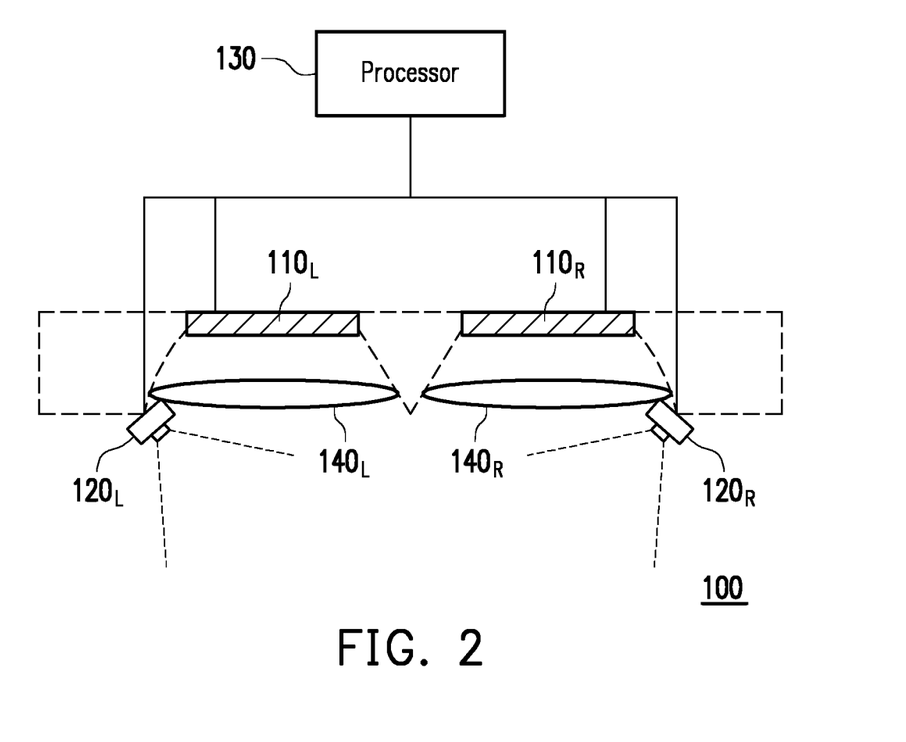
FIG. 2 is a schematic diagram of a stereoscopic display device according to an embodiment of the invention.

FIG. 1 is a schematic block diagram of a stereoscopic display device according to an embodiment of the invention. FIG. 2 is a schematic diagram of a stereoscopic display device according to an embodiment of the invention.

Referring to FIG. 1, a stereoscopic display device 100 includes a stereoscopic display 110, a camera 120 and a processor 130. The stereoscopic display 110 and the camera 120 are both coupled to the processor 130. In the embodiment, the stereoscopic display device 100 includes, for example, a virtual reality (VR) display device such as a head mounted display (HMD), which is configured to display a stereoscopic image. However, the invention does not limit a specific structure and an implementation way of the stereoscopic display device 100 herein.

The stereoscopic display 110 includes, for example, a single panel or a plurality of panels, and may be configured to receive display signals from the processor 130 to display stereoscopic images. In the embodiment, the stereoscopic display 110 is implemented in a head mounted display for respectively providing two images having parallax to the eyes of users. As shown in FIG. 2, the stereoscopic display 110 includes a left panel $110_L$, a right panel $110_R$, a left lens $140_L$, and a right lens $140_R$. The left panel $110_L$ is configured to provide a left eye image, such that the left eye image is imaged in the left eye of a user through the left lens $140_L$. The right panel $110_R$ is configured to provide a right eye image, such that the right eye image is imaged in the right eye of the user through the right lens $140_R$. By adjusting the content of the left eye image and the right eye image, the user can feel a stereoscopic image. However, the invention is not limited thereto, and those of ordinary skill in the art may implement the stereoscopic display 110 according to the knowledge of stereoscopic display.

The camera 120 is disposed adjacent to the stereoscopic display 110 for capturing a human eye image of a user. In the embodiment, as shown in FIG. 2, the camera 120 includes a left camera $120_L$ and a right camera $120_R$, which are respectively disposed corresponding to the left panel $110_L$ and the right panel $110_R$ of the stereoscopic display 110 to obtain the left eye image and the right eye image of the user. In some embodiments, the camera 120 includes, for example, a lens and a photosensitive component. The photosensitive component is, for example, a charge coupled device (CCD), a complementary metal-oxide semiconductor (CMOS) component, or other components, and the camera 120 may further include an aperture or the like, which is not limited herein. In some embodiments, the camera 120 is implemented, for example, by an eye tracker, but is not limited thereto.

The processor 130 is coupled to the stereoscopic display 110 and the camera 120 for generating an image signal according to a human eye parameter such as an interpupillary distance parameter and an eye relief parameter, and sending the image signal to the stereoscopic display 110 for display. In the embodiment, the processor 130 first performs the parameter calibration method of the embodiment to calibrate a human eye parameter, and then generates an image signal according to the calibrated human eye parameter. In some embodiments, the processor 130 is, for example, one or a combination of a graphics processing unit (GPU) and an image signal processor (ISP) disposed inside or outside the head mounted display. However, the invention is not limited thereto. In other embodiments, the processor 130 may also include, for example, a central processing unit (CPU), or other programmable general-purpose or special-purpose microprocessors, digital signal processors (DSP), programmable controllers, application specific integrated circuits (ASIC), programmable logic devices (PLD) or other similar devices or a combination of these devices.

Figure 3:
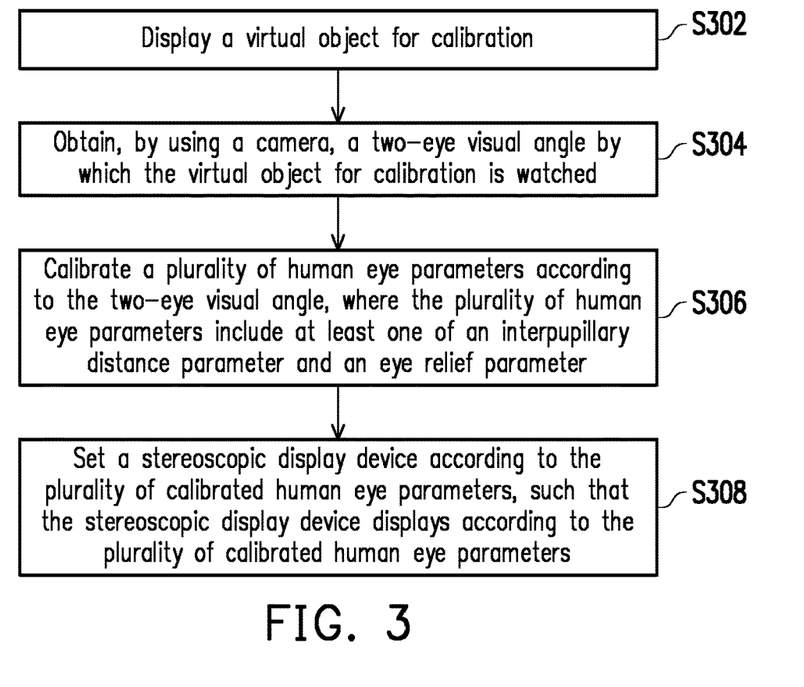
FIG. 3 is a flowchart of a parameter calibration method according to an embodiment of the invention.
Figure 4:
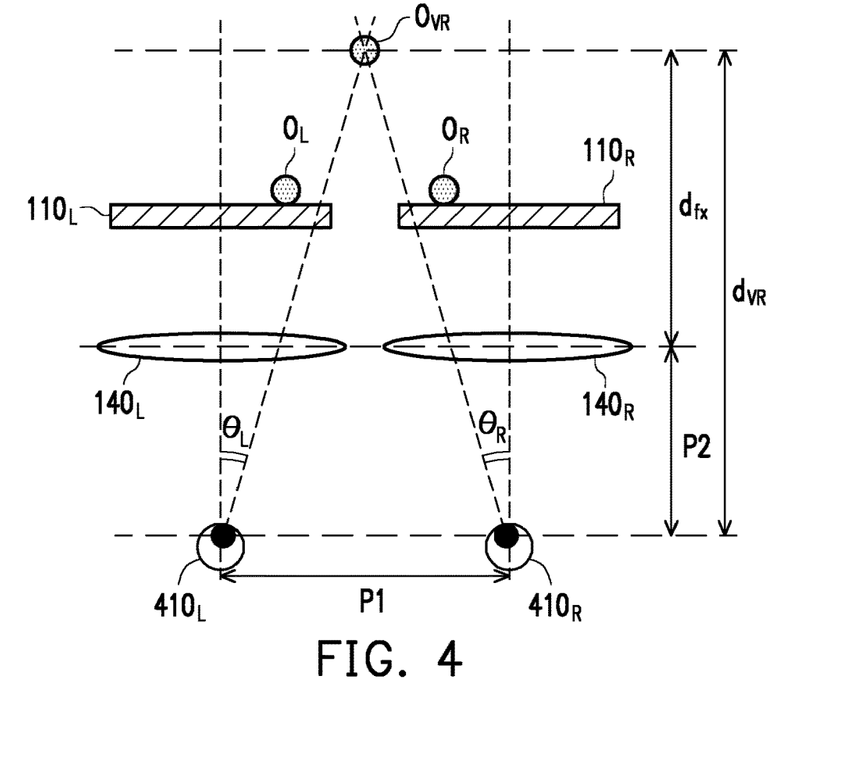
FIG. 4 is a schematic diagram of a parameter calibration method according to an embodiment of the invention.

FIG. 3 is a flowchart of a parameter calibration method according to an embodiment of the invention. FIG. 4 is a schematic diagram of a parameter calibration method according to an embodiment of the invention.

The parameter calibration method of the embodiment is applicable to the stereoscopic display device 100 in the embodiments of FIG. 1 and FIG. 2, so the parameter calibration method of the embodiment of the invention will be described in detail below with reference to various components in the embodiments of FIG. 1 and FIG. 2. In the embodiment, the parameter calibration method is automatically performed, for example, each time the user wears the head mounted display, so that the calibrated human eye parameters can be used in subsequent display. However, the invention is not limited thereto. In some embodiments, the user may also self-activate a parameter calibration function at any time, for example, as needed to perform the parameter calibration method.

Referring to FIG. 3, in step S302, the stereoscopic display 110 displays a virtual object for calibration. As shown in FIG. 4, when the processor 130 displays a virtual object $O_{VR}$ for calibration through the stereoscopic display 110, for example, according to a set of human eye parameters (such as preset human eye parameters), a left object image $O_L$ is displayed through the left panel $110_L$, and a right object image $O_R$ is displayed through the right panel $110_R$. After the left object image $O_L$ is imaged in a left eye $410_L$ of a user by the left lens $140_L$ and the right object image $O_R$ is imaged in a right eye $410_R$ of the user by the right lens $140_R$, the user feels the virtual object $O_{VR}$. Since a distance $d_{fx}$ between a lens (including the left lens $140_L$ and the right lens $140_R$) and a plane where the virtual object $O_{VR}$ is located can be controlled by the parallax between the left object image $O_L$ and the right object image $O_R$, a virtual distance $d_{VR}$ of the virtual object $O_{VR}$ perceived by the user can also be controlled by the parallax between the left object image $O_L$ and the right object image $O_R$. When the parallax between the left object image $O_L$ and the right object image $O_R$ is smaller, the virtual distance $d_{VR}$ is larger, and when the parallax between the left object image $O_L$ and the right object image $O_R$ is larger, the virtual distance $d_{VR}$ is smaller.

In step S304, the camera 120 is used to obtain a two-eye visual angle by which the virtual object for calibration is watched. In the embodiment, the two-eye visual angle includes a left-eye visual angle and a right-eye visual angle. As shown in FIG. 4, the processor 130 captures, by using the left camera $120_L$ disposed corresponding to the left panel $110_L$, a left-eye visual angle $\theta_L$ of the user when watching the virtual object $O_{VR}$, and captures, by using the right camera $120_R$ disposed corresponding to the right panel $110_R$, a right-eye visual angle $\theta_R$ of the user when watching the virtual object $O_{VR}$.

In step S306, a plurality of human eye parameters are calibrated according to the two-eye visual angle, where the plurality of human eye parameters include at least one of an interpupillary distance parameter and an eye relief parameter. As shown in FIG. 4, since there is a specific geometric relationship between the virtual distance $d_{VR}$ of the virtual object $O_{VR}$, the two-eye visual angle (including the left-eye visual angle $\theta_L$ and the right-eye visual angle $\theta_R$) and an actual interpupillary distance P1 of the user, the processor 130 can calibrate either or both of an interpupillary distance parameter and an eye relief parameter by using the two-eye visual angle obtained by the camera 120.

In some embodiments, in the case where the virtual distance $d_{VR}$ of the virtual object $O_{VR}$ is known, the processor 130 may calculate the interpupillary distance P1 to calibrate an interpupillary distance parameter according to the known virtual distance $d_{VR}$ and the two-eye visual angle (including the left-eye visual angle $\theta_L$ and the right-eye visual angle $\theta_R$). For example, assuming that an actual eye relief p2 is almost equal to a preset eye relief parameter or a calibrated eye relief parameter, the virtual distance $d_{VR}$ may be calculated by adding the known distance $d_{fx}$ to the preset eye relief parameter or the calibrated eye relief parameter, and then the interpupillary distance P1 is calculated according to a geometric relationship between the virtual distance $d_{VR}$ of the virtual object $O_{VR}$, the two-eye visual angle and the interpupillary distance P1.

On the other hand, in the case where the interpupillary distance P1 is known, the processor 130 may calculate the virtual distance $d_{VR}$ according to the two-eye visual angle and the known interpupillary distance P1. The distance $d_{fx}$ is controlled by the processor 130 and known. Accordingly, the processor 130 can further calculate the eye relief P2 to calibrate the eye relief parameter. For example, assuming that the actual interpupillary distance P1 is almost equal to a preset interpupillary distance parameter or a calibrated interpupillary distance parameter, the processor 130 may calculate the virtual distance $d_{VR}$ according to the two-eye visual angle and a preset interpupillary distance parameter or the calibrated interpupillary distance parameter, and then further calculate the eye relief P2.

In some embodiments, a geometric relationship between the virtual distance $d_{VR}$ of the virtual object $O_{VR}$, the two-eye visual angle (including the left-eye visual angle $\theta_L$ and the right-eye visual angle $\theta_R$) and the interpupillary distance P1 is expressed by, for example, the following equation:

$$d_{VR} = P2 + d_{fx} = P1 \cdot \frac{\tan\theta_L \cdot \tan\theta_R}{\tan\theta_L + \tan\theta_R}.$$

However, as long as the two-eye visual angle obtained by using the camera 120 is used to calibrate the human eye parameters, the invention does not limit a specific manner during calibration herein.

In step S308, the processor 130 may set the stereoscopic display device 100 according to the plurality of calibrated human eye parameters, such that the stereoscopic display device 100 displays according to the plurality of calibrated human eye parameters. Specifically, after calibrating the human eye parameters, the processor 130 can generate an image signal according to the calibrated human eye parameters, so that the stereoscopic display 110 may display a stereoscopic image according to the calibrated human eye parameters. For example, if the calibrated eye relief parameter is greater than the preset eye relief parameter, it is indicated that the eye relief is greater than the preset eye relief parameter when the user actually uses the stereoscopic display device 100. In order to enable the user to feel a correct depth of field without deviation, if an object of a specific distance is displayed according to the preset eye relief parameter, the parallax between a left object image and a right object image is a first parallax, when the processor 130 displays the object of the same specific distance by using the calibrated eye relief parameter, the parallax between the left object image and the right object image will be a second parallax greater than the first parallax.

The parameter calibration method described in the above embodiment uses a hardware camera to capture a two-eye visual angle when a user watches a virtual object for calibration, uses the actually obtained two-eye visual angle to calibrate human eye parameters such as an interpupillary distance parameter and an eye relief parameter, and then uses a software to adjust, according to the calibrated human eye parameters, a display when a stereoscopic image is displayed subsequently. Compared with a traditional way of manually adjusting an interpupillary distance and an eye relief of hardware, the parameter calibration method described in the embodiment of the invention is more convenient and more accurate, and increases the comfort of a user when the user uses the stereoscopic display device 100, thereby improving the user experience.

The details of the parameter calibration method will be described below with another embodiment in more detail. It should be noted that the following embodiments are merely examples of the parameter calibration method for the sake of description, the invention is not limited to the details described below, and those of ordinary skill in the art can make appropriate changes or modifications according to their needs.

Figure 5:
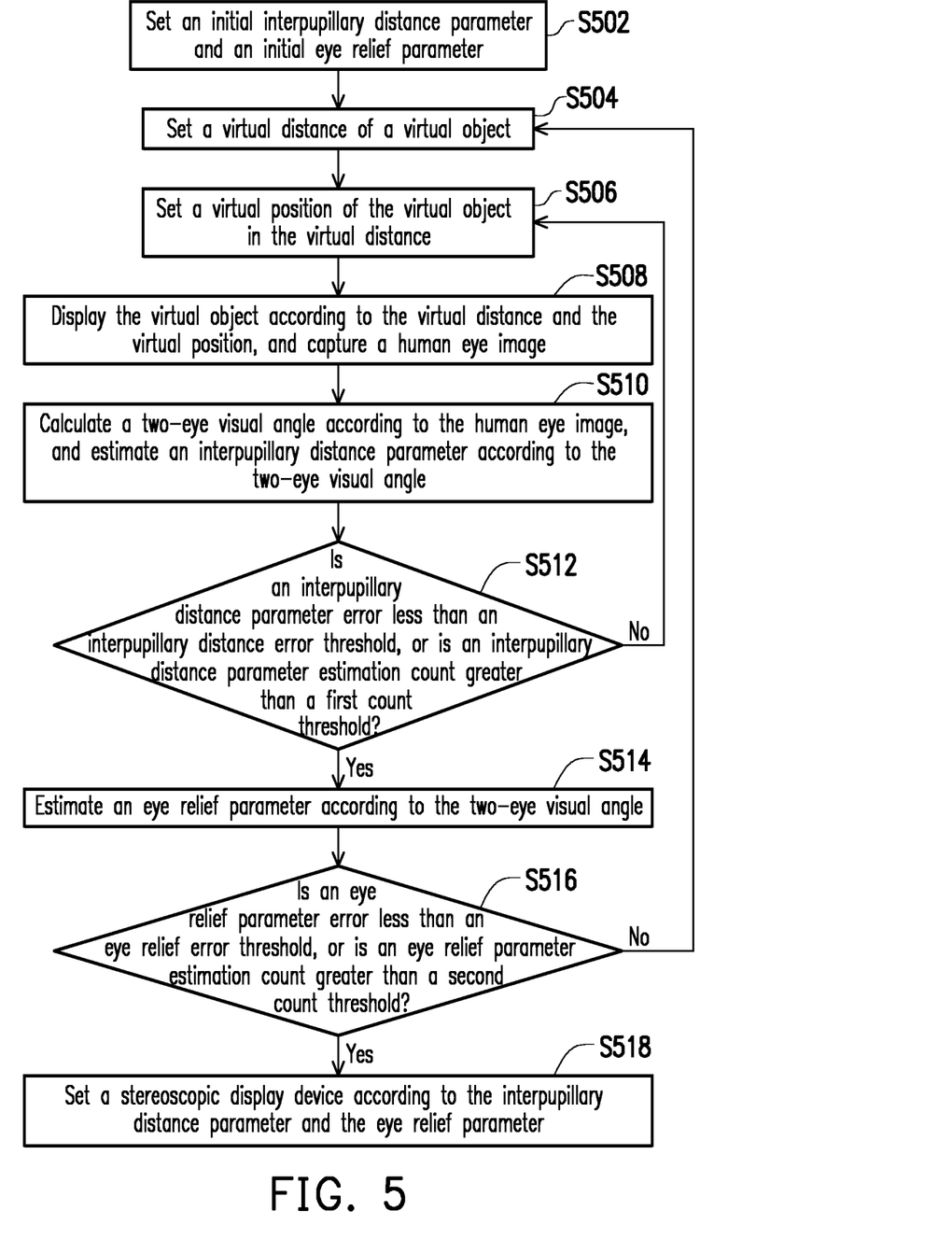
FIG. 5 is a flowchart of a parameter calibration method according to an embodiment of the invention.

FIG. 5 is a flowchart of a parameter calibration method according to another embodiment of the invention.

The parameter calibration method of the embodiment is also applicable to the stereoscopic display device 100 in the embodiments of FIG. 1, FIG. 2 and FIG. 4, so the parameter calibration method of the embodiment of the invention will be described in detail below with reference to various components in the embodiments of FIG. 1, FIG. 2 and FIG. 4.

Referring to FIG. 5, in step S502, an initial interpupillary distance parameter and an initial eye relief parameter are set first. For example, the processor 130 may set the initial interpupillary distance parameter and the initial eye relief parameter as a preset interpupillary distance parameter and a preset eye relief parameter, or set them as the previously calibrated interpupillary distance parameter and eye relief parameter. The invention is not limited thereto.

In step S504, a virtual distance of a virtual object is set. In step S506, a virtual position of the virtual object in the virtual distance is set. In some embodiments, the processor 130 sets, for example, the virtual distance $d_{VR}$ of the virtual object $O_{VR}$ for calibration as 1 m, and sets it to be located in the center of image.

In step S508, the processor 130 may display the virtual object through the stereoscopic display 110 according to the virtual distance and the virtual position, and use the camera 120 to capture a human eye image. In some embodiments, if the initial eye relief parameter is 5 cm and the virtual distance $d_{VR}$ is 1 m, the processor 130 controls, for example, the parallax and the position of the left object image and the right object image to control the distance $d_{fx}$ to be 95 cm when the virtual object $O_{VR}$ is displayed, and enables the virtual object $O_{VR}$ to be located in the center of image.

In step S510, the processor 130 may calculate a two-eye visual angle according to the human eye image, and estimate an interpupillary distance parameter according to the two-eye visual angle. In some embodiments, the processor 130 may estimate, for example, an interpupillary distance parameter through the geometric relationship described in the embodiment of FIG. 3 according to the virtual distance $d_{VR}$ (such as 1 m) and the two-eye visual angle (including the left-eye visual angle $\theta_L$ and the right-eye visual angle $\theta_R$). Those of ordinary skill in the art can understand how to calculate a two-eye visual angle according to a human eye image based on related documents such as an eye tracker, and the descriptions thereof are omitted herein.

In step S512, the processor 130 may determine whether an error between the estimated interpupillary distance parameter and the initial interpupillary distance parameter is less than an interpupillary distance error threshold, or whether an interpupillary distance parameter estimation count is greater than a first count threshold. For example, if the estimated interpupillary distance parameter is not much different from the initial interpupillary distance parameter, it is indicated that the initial interpupillary distance parameter is accurate enough without adjustment, that is, the initial interpupillary distance parameter can be directly specified as the calibrated interpupillary distance parameter for use. In the embodiment, the processor 130 may set the interpupillary distance error threshold. If the error between the estimated interpupillary distance parameter and the initial interpupillary distance parameter is less than the interpupillary distance error threshold, step S514 is performed directly. Otherwise, if the error between the estimated interpupillary distance parameter and the initial interpupillary distance parameter is not less than the interpupillary distance error threshold, step S506 will be returned to in order to reset the virtual position of the virtual object in the set virtual distance. Next, the foregoing steps S508 to S512 are repeated until the process proceeds to step S514.

In order to prevent the calibration time from being too long due to the fact that steps S506 to S512 are repeated for too many times, the processor 130 also sets a first count threshold. Once the processor 130 determines that the interpupillary distance parameter estimation count (i.e., number of times of estimating the interpupillary distance parameter) is higher than the first count threshold, that is, the execution count of step S510 exceeds the first count threshold, the processor 130 specifies an interpupillary distance parameter in step S512 and proceeds to step S514. The invention does not limit a way of specifying an interpupillary distance parameter herein. The specified interpupillary distance parameter may be, for example, the average of all previously estimated interpupillary distance parameters.

Figure 6:
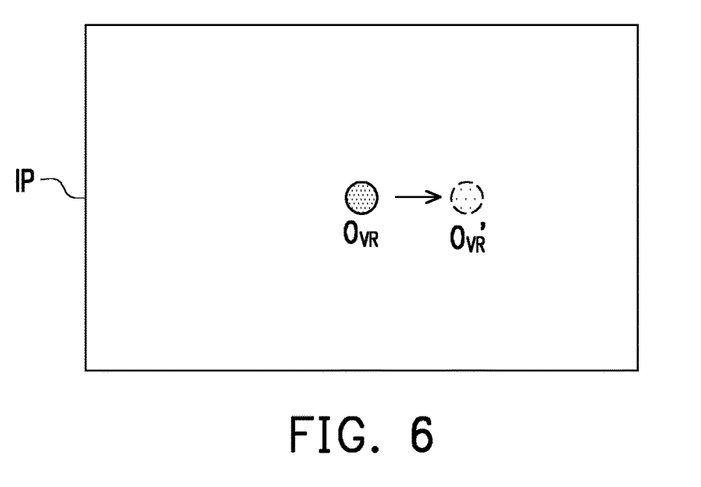
FIG. 6 is a schematic diagram of resetting a virtual position of a virtual object in a virtual distance according to an embodiment of the invention.

FIG. 6 is a schematic diagram of resetting a virtual position of a virtual object in a virtual distance according to an embodiment of the invention.

Referring to FIG. 6, in some embodiments, when returning from step S512 to step S506, the processor 130 moves (for example, deviating rightward by 5 cm) the virtual object $O_{VR}$ for calibration while maintaining the virtual distance $d_{VR}$ unchanged (for example, maintaining for 1 m) to display the virtual object $O_{VR}'$ in the same distance but at different positions in step S508. In other words, the virtual object $O_{VR}$ and the virtual object $O_{VR}'$ are located in a plane IP of the same virtual distance $d_{VR}$.

Since the virtual distance of the virtual object displayed in the cycle of steps S506 to S512 does not change, the interpupillary distance parameter calculated from the two-eye visual angle obtained each time is ideally the same. However, various errors may occur in reality, so the interpupillary distance parameters calculated each time are not exactly the same. Accordingly, a plurality of interpupillary distance parameters are calculated within the first count threshold, and the calibrated interpupillary distance parameters are specified according to the calculated interpupillary distance parameters, so that more accurate results can be obtained. It is worth mentioned that as the specified first count threshold is greater, the calibration result may be more accurate, but the required calibration time is also longer.

In step S514, the processor 130 may estimate an eye relief parameter according to the two-eye visual angle. In some embodiments, the processor 130 estimates, for example, the virtual distance $d_{VR}$ of the virtual object $O_{VR}$ according to the two-eye visual angle (including the left-eye visual angle $\theta_L$ and the right-eye visual angle $\theta_R$) and the interpupillary distance parameter specified in step S512 through the geometric relationship described in the embodiment of FIG. 3, thus estimating the eye relief parameter. For example, the processor 130 may obtain an estimated eye relief parameter after subtracting the distance $d_{fx}$ (for example, 95 cm) from the virtual distance $d_{VR}$ estimated according to the two-eye visual angle and the interpupillary distance parameter specified in step S512 through the foregoing geometric relationship.

In step S516, the processor 130 may determine whether an error between the estimated eye relief parameter and the initial eye relief parameter is less than an eye relief error threshold, or whether an eye relief parameter estimation count is greater than a second count threshold. For example, if the estimated eye relief parameter is not much different from the initial eye relief parameter, it is indicated that the initial eye relief parameter is accurate enough without adjustment, that is, the initial eye relief parameter can be directly specified as the calibrated eye relief parameter for use. In the embodiment, the processor 130 may set the eye relief error threshold. If the error between the estimated eye relief parameter and the initial eye relief parameter is less than the eye relief error threshold, step S518 is performed directly. Otherwise, if the error between the estimated eye relief parameter and the initial eye relief parameter is not less than the eye relief error threshold, step S504 will be returned to in order to reset the virtual distance of the virtual object. Next, the foregoing steps S506 to S516 are repeated until the process proceeds to step S518.

Similarly, in order to prevent the calibration time from being too long due to the fact that steps S504 to S516 are repeated for too many times, the processor 130 may set a second count threshold. Once the processor 130 determines that the eye relief estimation parameter count (i.e., number of times of estimating the eye relief parameter) is higher than the second count threshold, that is, the execution count of step S514 exceeds the second count threshold, the processor 130 specifies an eye relief parameter in step S516 and proceeds to step S518. The invention does not limit a way of specifying an eye relief parameter herein. The specified eye relief parameter may be, for example, the average of all previously estimated eye relief parameters.

Figure 7:
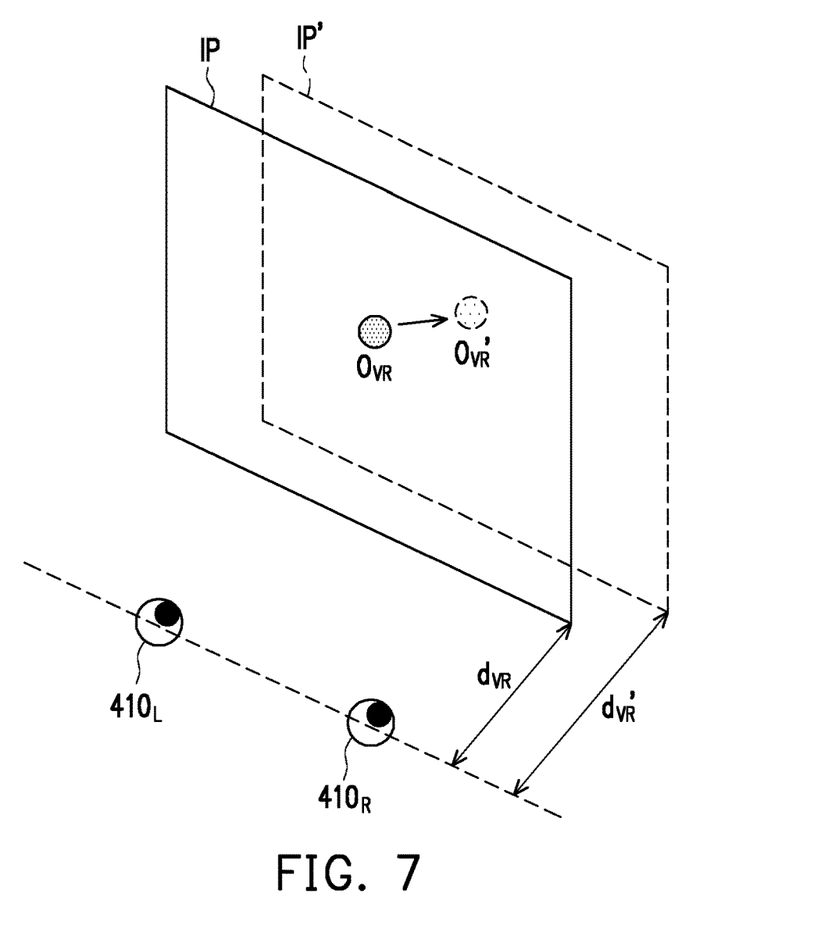
FIG. 7 is a schematic diagram of resetting a virtual distance of the virtual object according to an embodiment of the invention.

FIG. 7 is a schematic diagram of resetting a virtual distance of a virtual object according to an embodiment of the invention.

Referring to FIG. 7, in some embodiments, when returning from step S516 to step S504, the processor 130 adjusts, for example, the virtual object $O_{VR}$ for calibration to a virtual distance $d_{VR}'$ (for example, adjusting $d_{fx}$ from 95 cm to 115 cm, that is, adjusting a virtual distance $d_{VR}$ of 1 m to a virtual distance $d_{VR}'$ of 1.2 m) to display the virtual object $O_{VR}'$ at different distances in step S508. In other words, the virtual object $O_{VR}$ and the virtual object $O_{VR}'$ are located in a plane IP of the virtual distance $d_{VR}$ and a plane IP' of the virtual distance $d_{VR}'$ respectively.

Since the interpupillary distance parameters used in the cycle of steps S504 to S516 cannot change, the eye relief parameters calculated according to the two-eye visual angle obtained by each virtual distance is ideally the same. However, various errors may occur in reality, so the eye relief parameters calculated each time are not exactly the same. Accordingly, a plurality of eye relief parameters are calculated within the second count threshold, and the calibrated eye relief parameters are specified according to the calculated eye relief parameters, so that more accurate results can be obtained. It is worth mentioned that as the specified second count threshold is greater, the calibration result may be more accurate, but the required calibration time is also longer.

Finally, in step S518, the processor 130 may set the stereoscopic display device 100 according to the calibrated interpupillary distance parameter and eye relief parameter, such that the stereoscopic display device 100 displays according to the calibrated interpupillary distance parameter and eye relief parameter. Specifically, after obtaining the calibrated interpupillary distance parameter and eye relief parameter, the processor 130 can generate an image signal according to the calibrated interpupillary distance parameter and eye relief parameter, so that the stereoscopic display 110 may display a stereoscopic image according to the calibrated interpupillary distance parameter and eye relief parameter. In the embodiment, step S518 is similar to step S308 in the embodiment of FIG. 3, so the details of the repetition are omitted herein.

Based on the foregoing, the stereoscopic display device and the parameter calibration method thereof according to the embodiments of the invention can use a camera to obtain a two-eye visual angle when a user watches a virtual object for calibration, and accordingly calibrate a human eye parameter such as an interpupillary distance parameter and an eye relief parameter. After the calibrated human eye parameter is obtained, the display content when the stereoscopic image is displayed is adjusted according to the human eye parameter. Accordingly, the parameter calibration of the stereoscopic display device becomes more convenient and more accurate, which increases the comfort of a user when the user uses the stereoscopic display device, thereby improving the user experience.

Although the invention has been disclosed with the foregoing embodiments, it is not intended to limit the invention, and any person of ordinary skill in the art can make some modifications and refinements without departing from the spirit and scope of the invention. Therefore, the scope of protection of the invention should be defined by the scope of the appended claims.

What is claimed is:

1. A parameter calibration method applicable to a stereoscopic display device comprising a camera, the parameter calibration method comprising:
    setting an initial interpupillary distance and an initial eye-relief parameter;
    setting a virtual object for calibration, wherein the virtual object has a virtual distance and a virtual position at the virtual distance;
    displaying the virtual object for calibration according to the virtual distance and the virtual position;
    obtaining, by using the camera, a two-eye visual angle by which the virtual object for calibration is watched;
    estimating an interpupillary distance parameter according to the two-eye visual angle and the virtual distance;
    calibrating the initial interpupillary distance parameter according to the interpupillary distance parameter when an error between the interpupillary distance parameter and the initial interpupillary distance parameter is less than a threshold, and resetting the virtual position of the virtual object at the virtual distance to update the interpupillary distance parameter when the error between the interpupillary distance parameter and the initial interpupillary distance parameter is greater or equal to the threshold;
    estimating an eye relief parameter according to the two-eye visual angle and the calibrated initial interpupillary distance parameter; and
    setting the stereoscopic display device according to the calibrated initial interpupillary distance parameter and the estimated eye relief parameter to display on the stereoscopic display device according to the calibrated initial interpupillary distance parameter and the estimated eye relief parameter.

2. The parameter calibration method according to claim 1, further comprising:
    capturing at least one first human eye image when resetting the virtual position of the virtual object at the virtual distance;
    calculating at least one first two-eye visual angle according to the at least one first human eye image; and
    calibrating the interpupillary distance parameter according to the at least one first two-eye visual angle.

3. The parameter calibration method according to claim 2, further comprising:
    capturing at least one second human eye image when resetting the virtual position of the virtual object at an other virtual distance that is different from the virtual distance;
    calculating at least one second two-eye visual angle according to the at least one second human eye image; and
    calibrating the eye relief parameter according to the at least one second two-eye visual angle.

4. The parameter calibration method according to claim 3, wherein
    the virtual position of the virtual object is reset at the other virtual distance when an error between the estimated eye relief parameter and the initial eye relief parameter is less than an eye relief error threshold.

5. A stereoscopic display device, comprising:
    a stereoscopic display, configured to display a virtual object for calibration;
    a camera, configured to capture a human eye image of watching the virtual object for calibration; and
    a processor, coupled to the stereoscopic display and the camera, and configured to:
    set an initial interpupillary distance and an initial eye-relief parameter;
    set the virtual object for calibration, wherein the virtual object has a virtual distance and a virtual position at the virtual distance, wherein the stereoscopic display is configured to display the virtual object for calibration according to the virtual distance and the virtual position;
    obtain, according to the human eye image, a two-eye visual angle by which the virtual object for calibration is watched;
    estimate an interpupillary distance parameter according to the two-eye visual angle and the virtual distance;
    calibrate the initial interpupillary distance parameter according to the interpupillary distance parameter when an error between the interpupillary distance parameter and the initial interpupillary distance parameter is less than a threshold, and reset the virtual position of the virtual object at the virtual distance to update the interpupillary distance parameter when the error between the interpupillary distance parameter and the initial interpupillary distance parameter is greater or equal to the threshold;
    estimate an eye relief parameter according to the two-eye visual angle and the calibrated initial interpupillary distance parameter; and
    display by using the stereoscopic display according to the calibrated initial interpupillary distance parameter and the estimated eye relief parameter.

6. The stereoscopic display device according to claim 5, wherein the camera captures at least one first human eye image when resetting the virtual position of the virtual object at the virtual distance, and the processor calculates at least one first two-eye visual angle according to the at least one first human eye image and calibrates the interpupillary distance parameter according to the at least one first two-eye visual angle.

7. The stereoscopic display device according to claim 6, wherein the camera captures at least one second human eye image when resetting the virtual position of the virtual object at another virtual distance that is different from the virtual distance, and the processor calculates at least one second two-eye visual angle according to the at least one second human eye image and calibrates the eye relief parameter according to the at least one second two-eye visual angle, wherein the at least one second virtual object and the at least one first virtual object are located in different virtual distances.

8. The stereoscopic display device according to claim 7, wherein the virtual position of the virtual object is reset at the other virtual distance when an error between the estimated eye relief parameter and the initial eye relief parameter is less than an eye relief error threshold.

* * * * *